US012735056B2

(12) United States Patent
Honjo

(10) Patent No.: US 12,735,056 B2
(45) Date of Patent: Sep. 15, 2026

(54) VEHICLE CONTROL DEVICE, VEHICLE, VEHICLE CONTROL METHOD, AND STORAGE MEDIUM

(71) Applicant: HONDA MOTOR CO., LTD., Tokyo (JP)

(72) Inventor: Takuya Honjo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/056,183

(22) Filed: Feb. 18, 2025

(65) Prior Publication Data

US 2025/0289445 A1 Sep. 18, 2025

(30) Foreign Application Priority Data

Mar. 15, 2024 (JP) ................................ 2024-041140

(51) Int. Cl.

*B60W 50/029* (2012.01)
*B60W 20/50* (2016.01)
*B60W 50/00* (2006.01)
*B60W 50/02* (2012.01)
*B60L 58/26* (2019.01)

(52) U.S. Cl.

CPC .......... *B60W 50/029* (2013.01); *B60W 20/50* (2013.01); *B60W 50/00* (2013.01); *B60W 50/0205* (2013.01); *B60L 58/26* (2019.02); *B60L 2240/545* (2013.01); *B60W 2050/0295* (2013.01); *B60W 2510/087* (2013.01); *B60W 2510/246* (2013.01)

(58) Field of Classification Search

None

See application file for complete search history.

(56) References Cited

U.S. PATENT DOCUMENTS

2017/0174207 A1 6/2017 Nishidono
2022/0371577 A1* 11/2022 Narita .................. B60W 10/30

FOREIGN PATENT DOCUMENTS

JP 2001-112101 A 4/2001
JP 2009298373 A * 12/2009
JP 2016-002930 A 1/2016
JP 2017-114210 A 6/2017
JP 2022-094849 A 6/2022

(Continued)

OTHER PUBLICATIONS

Office Action dated Sep. 2, 2025 issued in the corresponding Japanese Patent Application 2024-041140 with the English machine translation thereof.

*Primary Examiner* — Peter D Nolan
*Assistant Examiner* — Michael F Whalen
(74) *Attorney, Agent, or Firm* — Carrier, Shende & Associates P.C.; Joseph P. Carrier; Fulchand P. Shende

(57) ABSTRACT

A vehicle control device for controlling a vehicle including an electrical power generation unit capable of supplying electrical power to a first driving source for driving first drive wheels and a second driving source for driving second drive wheels, and a cooling mechanism for cooling the power generation unit includes an abnormality determination unit for determining whether the cooling mechanism has an abnormality, and a control unit capable of executing a supply limiting process for limiting a supply of electrical power from the electrical power generation unit to the second driving source in the case where the cooling mechanism has an abnormality.

10 Claims, 4 Drawing Sheets

(56) References Cited

FOREIGN PATENT DOCUMENTS

| | | | |
|---|---|---|---|
| JP | 2022-170419 | A | 11/2022 |
| JP | 7205650 | B2 | 1/2023 |
| JP | 2023-121669 | A | 8/2023 |
| WO | 2016/035188 | A1 | 3/2016 |

* cited by examiner

FIG. 1

24(10)
70(704)
SECOND OPENING (SECOND SHUTTER DEVICE)
56, 68
A2
SECOND RADIATOR
58
RF2
64
HEAT EXCHANGER
62
RF3
60
ELECTRICAL POWER CONVERSION DEVICE
22
46
66
FIRST DRIVING SOURCE
32
70(702)
44
70(703)
FIRST OPENING (FIRST SHUTTER DEVICE)
48, 54
A1
FIRST RADIATOR
50
RF1
52
70(701)
ENGINE
36
ELECTRICAL POWER GENERATION UNIT
30

FIG. 3

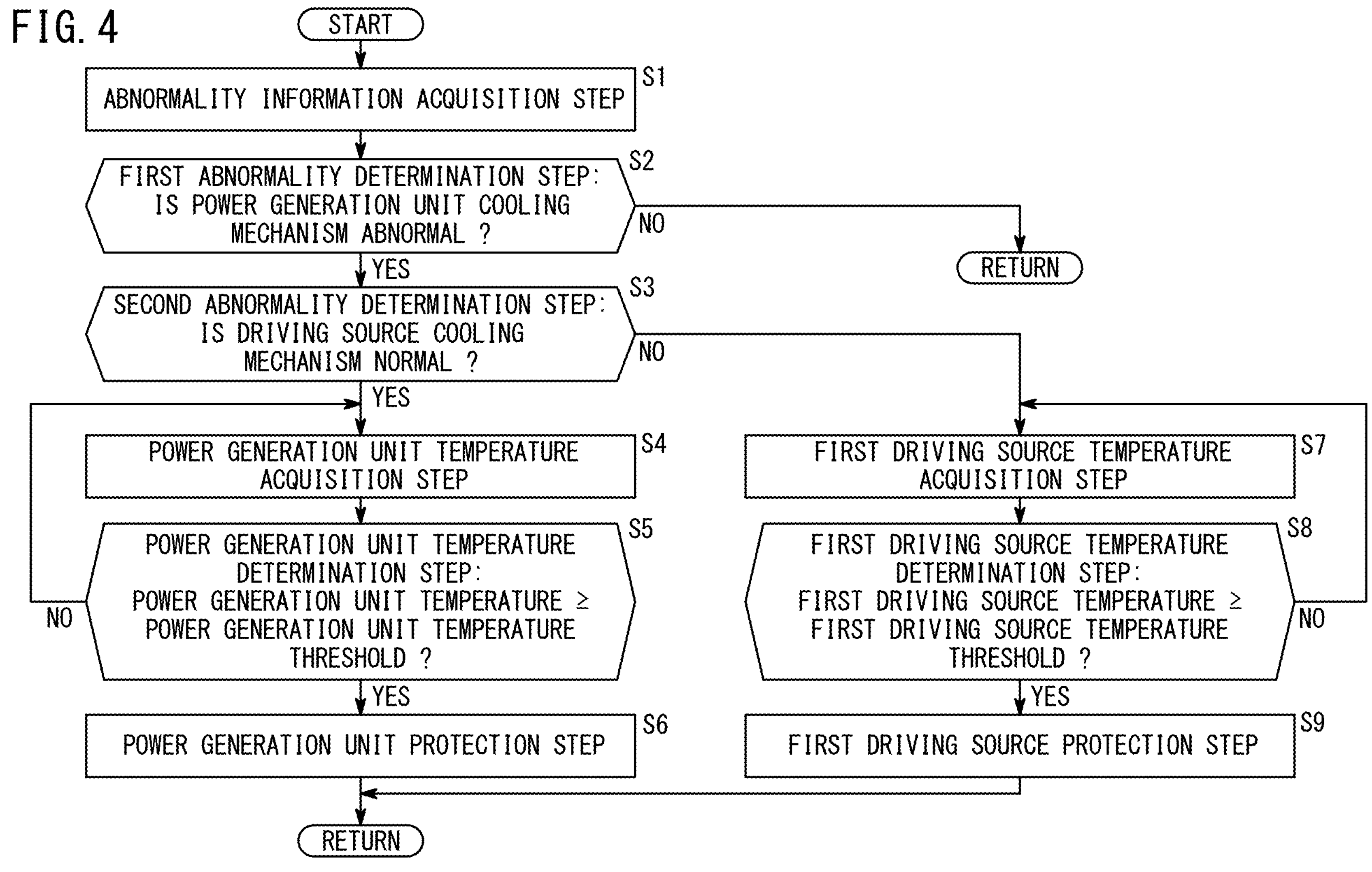
FIG. 4
START
S1
ABNORMALITY INFORMATION ACQUISITION STEP
S2
FIRST ABNORMALITY DETERMINATION STEP: IS POWER GENERATION UNIT COOLING MECHANISM ABNORMAL ?
YES
NO
RETURN
S3
SECOND ABNORMALITY DETERMINATION STEP: IS DRIVING SOURCE COOLING MECHANISM NORMAL ?
YES
NO
S4
POWER GENERATION UNIT TEMPERATURE ACQUISITION STEP
S5
POWER GENERATION UNIT TEMPERATURE DETERMINATION STEP: POWER GENERATION UNIT TEMPERATURE ≥ POWER GENERATION UNIT TEMPERATURE THRESHOLD ?
YES
NO
S6
POWER GENERATION UNIT PROTECTION STEP
S7
FIRST DRIVING SOURCE TEMPERATURE ACQUISITION STEP
S8
FIRST DRIVING SOURCE TEMPERATURE DETERMINATION STEP: FIRST DRIVING SOURCE TEMPERATURE ≥ FIRST DRIVING SOURCE TEMPERATURE THRESHOLD ?
YES
NO
S9
FIRST DRIVING SOURCE PROTECTION STEP
RETURN

VEHICLE CONTROL DEVICE, VEHICLE, VEHICLE CONTROL METHOD, AND STORAGE MEDIUM

CROSS-REFERENCE TO RELATED APPLICATIONS

This application is based upon and claims the benefit of priority from Japanese Patent Application No. 2024-041140 filed on Mar. 15, 2024, the contents of which are incorporated herein by reference.

BACKGROUND OF THE INVENTION

Field of the Invention

The present disclosure relates to a vehicle control device, a vehicle, a vehicle control method, and a storage medium.

Description of the Related Art

JP 2022-170419 A discloses a vehicle. According to JP 2022-170419 A, a vehicle is provided with an internal combustion engine, a shutter, and a radiator facing the shutter. The radiator releases, to external air, heat of a refrigerant that cools the internal combustion engine.

SUMMARY OF THE INVENTION

In recent years, there has been a demand for a technique that can maintain the traveling state of a vehicle for as long a time as possible even when a cooling efficiency of an internal combustion engine is limited.

The present invention has the object of solving the aforementioned problem.

A first aspect of the present invention is to provide a vehicle control device for controlling a vehicle including an electrical power generation unit configured to supply electrical power to a first driving source for driving a first drive wheel and to a second driving source for driving a second drive wheel, and a cooling mechanism configured to cool the electrical power generation unit, the vehicle control device including: an abnormality determination unit configured to determine whether the cooling mechanism has an abnormality; and a control unit configured to execute a supply limiting process for limiting a supply of electrical power from the electrical power generation unit to the second driving source in a case where the cooling mechanism is has an abnormality.

A second aspect of the present invention is to provide a vehicle including the vehicle control device according to the first aspect of the present invention.

A third aspect of the present invention is to provide a vehicle control method executed by a computer for controlling a vehicle including an electrical power generation unit configured to supply electrical power to a first driving source for driving a first drive wheel and to a second driving source for driving a second drive wheel, and a cooling mechanism configured to cool the electrical power generation unit, the vehicle control method including: an abnormality determination step of determining whether the cooling mechanism has an abnormality; and a control step of executing a process for limiting a supply of electrical power from the electrical power generation unit to the second driving source in a case where the cooling mechanism has an abnormality.

A fourth aspect of the present invention is a storage medium storing a program for causing the computer to execute the vehicle control method according to the third aspect of the present invention.

According to the present invention, a vehicle can maintain the traveling state for as long a time as possible even when a cooling efficiency of an internal combustion engine is limited.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic view showing a vehicle according to an embodiment;

FIG. 3 is a block diagram of a vehicle control device according to the embodiment; and FIG. 4 is a flowchart of a vehicle control method according to the embodiment.

DETAILED DESCRIPTION OF THE INVENTION

Figure 2:
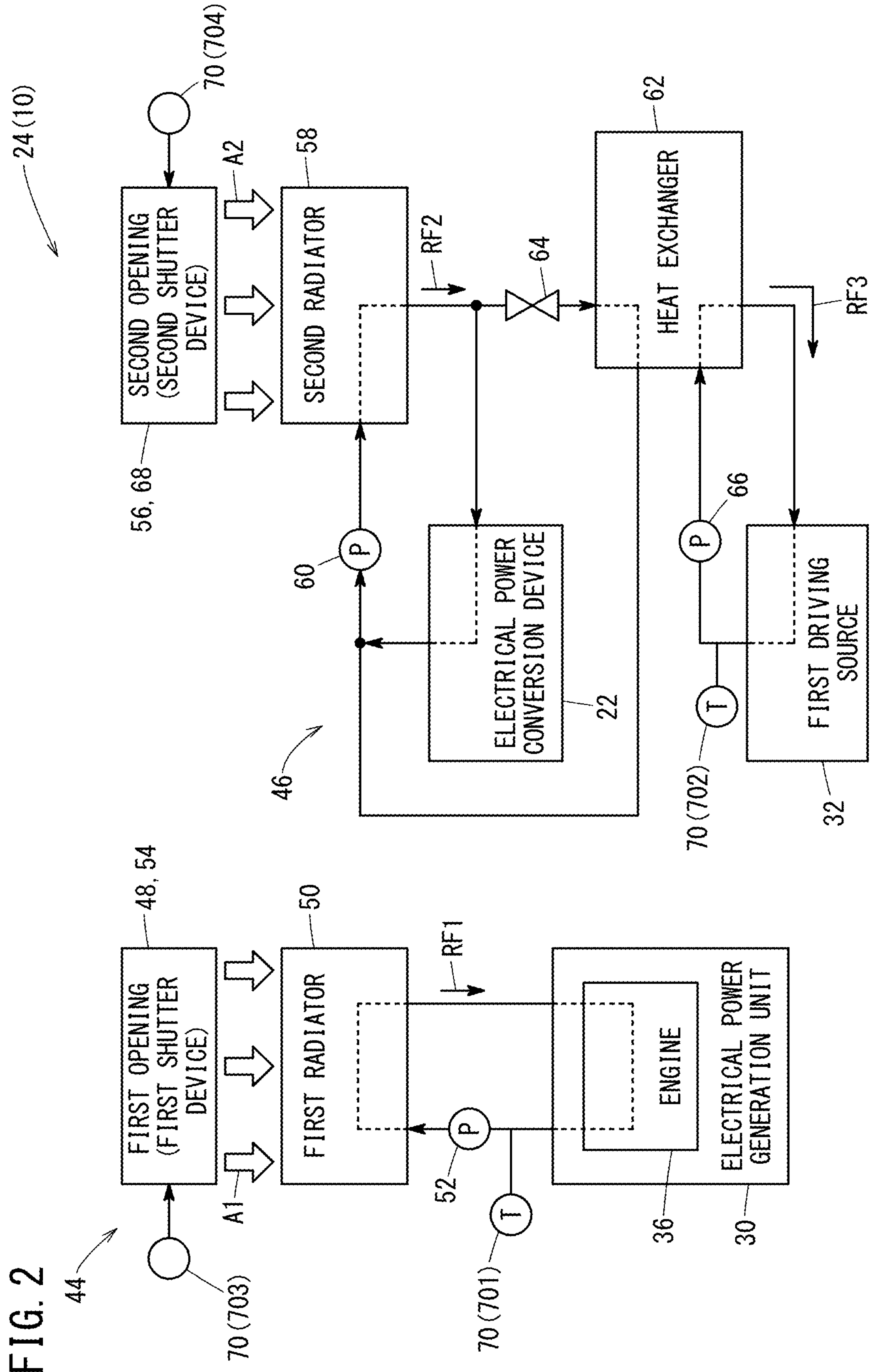
FIG. 2 is a schematic view showing a cooling device provided in the vehicle.

According to JP 2022-170419 A, cool air can be supplied to a radiator by putting the shutter into an open state. The radiator cools the refrigerant by using the cool air. The internal combustion engine is cooled by the refrigerant, and thus overheating of the internal combustion engine is suppressed.

If the shutter has an abnormality, the operation to open the shutter may be hindered. In this case, since the cool air is not sufficiently supplied to the radiator, the refrigerant (internal combustion engine) may not be sufficiently cooled. If the internal combustion engine is not sufficiently cooled, a concern that the traveling of the vehicle may be limited is raised.

Based on the above preliminary description, an embodiment will be described below.

EMBODIMENT

Figure 1:
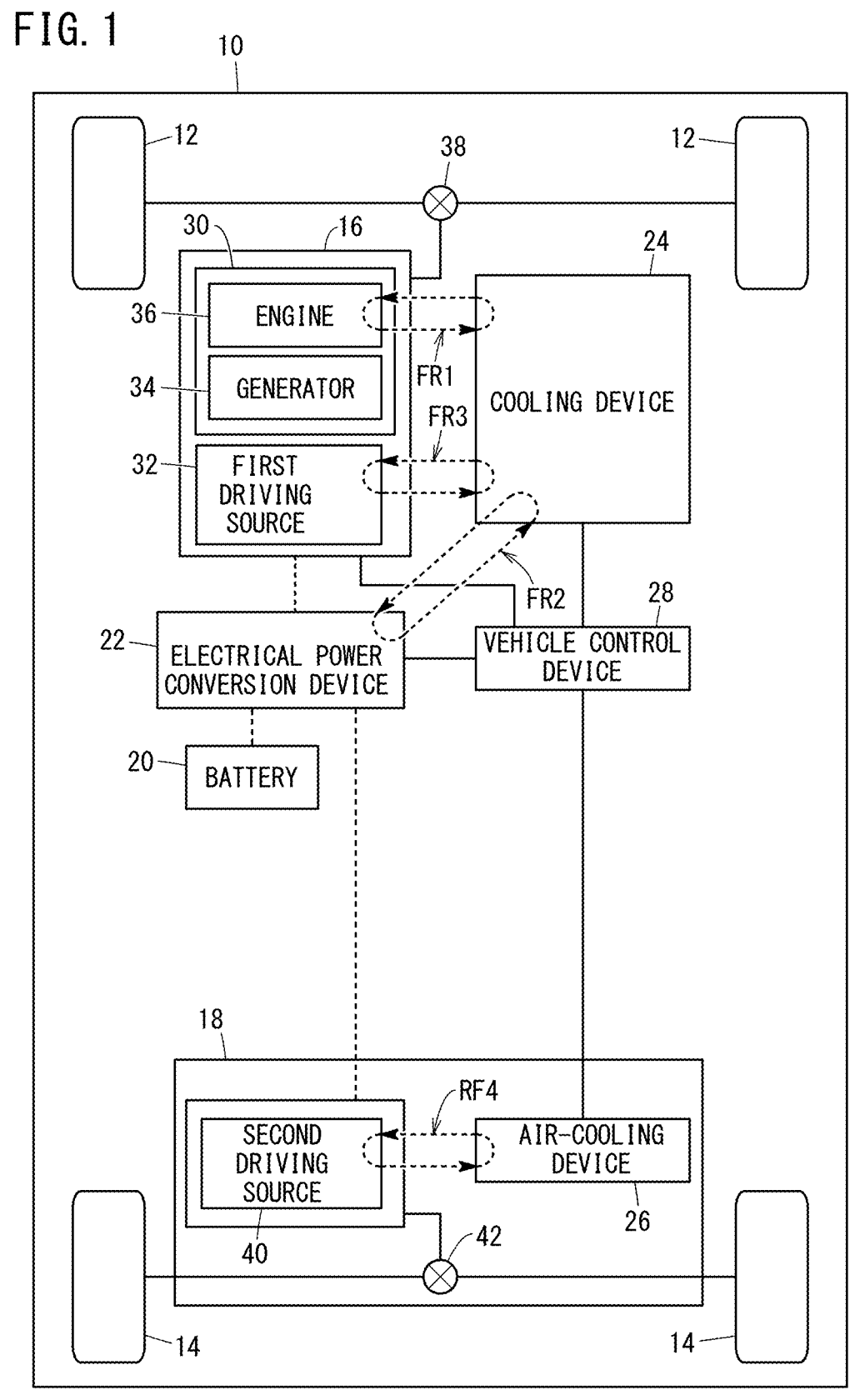

FIG. 1 is a schematic view showing a vehicle 10 according to an embodiment.

The vehicle 10 is, for example, an all-wheel drive (AWD) vehicle. In the present embodiment, a case where the vehicle 10 is a hybrid AWD vehicle will be described as an example. The vehicle 10 includes a first drive wheel 12, a second drive wheel 14, a first drive device 16, a second drive device 18, a battery 20, an electrical power conversion device 22, a cooling device (cooling system) 24, an air-cooling device 26, and a vehicle control device 28.

The first drive wheel 12 is one of a front wheel and a rear wheel of the vehicle 10. In the present embodiment, a case where the first drive wheel 12 is a front wheel will be described as an example, but the present invention is not limited thereto. On the other hand, the second drive wheel 14 is the other of the front wheel and the rear wheel of the vehicle 10. In the present embodiment, a case where the second drive wheel 14 is a rear wheel will be described as an example, but the present invention is not limited thereto.

The first drive device 16 is a device that drives the first drive wheel 12. The first drive device 16 includes an electrical power generation unit 30 and a first driving source 32. The electrical power generation unit 30 includes a generator 34 and an engine 36 that drives the generator 34. The engine 36 (an output shaft of the engine 36) may drive the generator 34. The generator 34 generates electrical power by being driven by the engine 36. The electrical power generation unit 30 can supply electrical power to the first driving source 32 and a second driving source 40 (second drive device 18) to be described later.

The first driving source 32 is an electric motor (motor) that can be driven by electrical power supplied from the generator 34. The first driving source 32 can transmit a driving force to the first drive wheel 12 via a first transmission mechanism 38. The first transmission mechanism 38 includes, for example, a transmission (not shown).

The engine 36 can supply a driving force to the first drive wheel 12 via the first transmission mechanism 38. The first drive wheel 12 may be driven by the driving force supplied from the first driving source 32 via the first transmission mechanism 38, or may be driven by the driving force supplied from the engine 36 via the first transmission mechanism 38.

The driving force output from the first drive device 16 toward the first drive wheel 12 is also referred to as a first driving force in the following description. In the following description, unless otherwise specified, the first driving force is output from the first driving source 32.

The second drive device 18 is a device that drives the second drive wheel 14. The second drive device 18 includes a second driving source 40 and a second transmission mechanism 42 connected to the second driving source 40. The second driving source 40 is an electric motor different from the first driving source 32. A shaft of the second driving source 40 is connected to the second drive wheel 14 via a second transmission mechanism 42. Therefore, the second driving source 40 can transmit the driving force to the second drive wheel 14 via the second transmission mechanism 42. The second transmission mechanism 42 includes, for example, a transmission (not shown). The second driving source 40 can be driven by electrical power supplied from the generator 34 (first drive device 16). The supply of electrical power from the generator 34 to the second driving source 40 can be carried out via the electrical power conversion device 22. In the case where the first drive wheel 12 is driven by the first drive device 16, the second driving source 40 may be used to generate regenerative electrical power.

In the present embodiment, a case where the rated output of the second driving source 40 is smaller than the rated output of the first driving source 32 will be described as an example, but the present invention is not limited thereto. The driving force output from the second drive device 18 (second driving source 40) toward the second drive wheel 14 is also referred to as a second driving force in the following description.

The supplied power conversion device 22 is connected to the first drive device 16, the second drive device 18, and the battery 20. The supplied power conversion device 22 includes, for example, a converter, an inverter, and the like. The electrical power conversion device 22 can convert electrical power supplied from the first drive device 16 (electrical power generation unit 30) to the second driving source 40. The electrical power conversion device 22 can step down the electrical power (voltage) supplied from the electrical power generation unit 30, and supply the stepped-down electrical power to the second driving source 40 having a relatively small rated output.

The battery 20 is a rechargeable secondary battery. The battery 20 includes, for example, a plurality of battery cells (not shown). Each of the plurality of battery cells is, for example, a lithium ion battery, a nickel-metal hydride battery, or the like, but is not limited thereto. The battery 20 is charged with, for example, electrical power generated by the generator 34. The battery 20 may be charged with the regenerative electrical power described above. In this case, the electrical power conversion device 22 may convert the electrical power to be supplied to the battery 20.

The battery 20 storing electricity can supply electrical power to at least one of the first drive device 16 (first driving source 32) and the second drive device 18 (second driving source 40) as necessary. In this case, the electrical power conversion device 22 described above may convert the electrical power to be supplied to at least one of the first drive device 16 and the second drive device 18 from the battery 20.

FIG. 2 is a schematic view showing a cooling device 24 provided in the vehicle 10.

The cooling device 24 is a device (a group of mechanisms) that cools the first drive device 16. As will be described later, the cooling device 24 can cool not only the first drive device 16 but also the electrical power conversion device 22. The cooling device 24 includes a power generation unit cooling mechanism (cooling mechanism) 44 and a driving source cooling mechanism 46.

The power generation unit cooling mechanism 44 cools the electrical power generation unit 30. More specifically, the power generation unit cooling mechanism 44 cools at least the engine 36 of the electrical power generation unit 30. The power generation unit cooling mechanism 44 cools the engine 36 by the refrigerant RF1. The refrigerant RF1 is preferably, but not limited to, a liquid refrigerant. The liquid refrigerant may be water or oil. As shown in FIG. 2, the power generation unit cooling mechanism 44 includes a first shutter device (shutter device) 48, a first radiator 50, and a first pump 52.

The first shutter device 48 includes, for example, a grille shutter for taking in outside air. The first shutter device 48 is attached to a first opening 54. The first opening 54 is an opening (air supply opening) formed in the vehicle 10. The first opening 54 may be formed, for example, in a front part of the vehicle 10. The first opening 54 can be opened and closed by the first shutter device 48.

The first radiator 50 can be supplied with outside air (cool air A1 in FIG. 2) via the first opening 54 open to the outside through the first shutter device 48. The first radiator 50 cools the refrigerant RF1 by using the cool air A1.

The refrigerant RF1 fed by the first pump 52 circulates between the first radiator 50 and the electrical power generation unit 30 (engine 36). Thus, the engine 36 can be cooled by the refrigerant RF1.

The driving source cooling mechanism 46 is a mechanism that cools the first driving source 32 with a refrigerant RF3. The driving source cooling mechanism 46 also cools the electrical power conversion device 22 with a refrigerant RF2. The refrigerant RF2 is a liquid refrigerant. As mentioned above, the liquid refrigerant may be water or oil. The refrigerant RF3 is preferably, but not limited to, a liquid refrigerant. As shown in FIG. 2, the driving source cooling mechanism 46 includes a second shutter device 56, a second radiator 58, a second pump 60, a heat exchanger 62, a valve device 64, and a third pump 66.

The second shutter device 56 includes, for example, a grille shutter for taking in outside air. The second shutter device 56 is attached to a second opening 68 formed in the vehicle 10. The second opening 68 is an opening (air supply opening) different from the first opening 54 described above. The second opening 68 may be formed, for example, in a front part of the vehicle 10. In this case, the first opening 54 (first shutter device 48) and the second opening 68 (second shutter device 56) are for example, vertically arranged, but the present invention is not limited thereto. The second opening 68 can be opened and closed by the second shutter device 56.

The second radiator 58 can be supplied with outside air (cool air A2 in FIG. 2) via the second opening 68 open to the outside through the second shutter device 56. The second radiator 58 cools the refrigerant RF2 by using the cool air A2.

The refrigerant RF2 fed by the second pump 60 circulates between the second radiator 58 and the electrical power conversion device 22. The refrigerant RF2 fed by the second pump 60 circulates also between the second radiator 58 and the heat exchanger 62. The second pump 60 may feed the refrigerant RF2 cooled by the second radiator 58 to the electrical power conversion device 22 and to the heat exchanger 62. The amount of the refrigerant RF2 to be supplied to the electrical power conversion device 22 and the amount of the refrigerant RF2 to be supplied to the heat exchanger 62 can be adjusted by the valve device 64. The electrical power conversion device 22 is cooled by the refrigerant RF2 supplied thereto.

The third pump 66 circulates the refrigerant RF3 between the heat exchanger 62 and the first driving source 32. The refrigerant RF3 exchanges heat with the refrigerant RF2 via the heat exchanger 62. As described above, the refrigerant RF2 to be supplied to the heat exchanger 62 is cooled by the second radiator 58. Therefore, the refrigerant RF3 can be cooled (liquid-cooled) by the refrigerant RF2 via the heat exchanger 62.

According to the driving source cooling mechanism 46, the electrical power conversion device 22 (the refrigerant RF2) and the first driving source 32 (the refrigerant RF3) are cooled by substantially one cooling device (the second radiator 58). Further, with the driving source cooling mechanism 46, the refrigerant RF3 for cooling the first driving source 32 is liquid-cooled by the refrigerant RF2 which is a liquid refrigerant. In general, the cooling efficiency by liquid cooling is better than the cooling efficiency by air cooling.

As shown in FIG. 2, the vehicle 10 is further provided with a plurality of sensors 70 (701 to 704). The plurality of sensors 70 include, for example, a first temperature sensor 701, a second temperature sensor 702, a first abnormality detection sensor 703, and a second abnormality detection sensor 704. The first temperature sensor 701 detects a temperature of the electrical power generation unit 30 (engine 36) as a power generation unit temperature. The first temperature sensor 701 may detect, as the power generation unit temperature, a temperature of the refrigerant RF1 heated by taking away heat from the electrical power generation unit 30. That is, the first temperature sensor 701 may detect the temperature of the refrigerant RF1 flowing from the electrical power generation unit 30 toward the first radiator 50, as the power generation unit temperature. The second temperature sensor 702 detects a temperature of the first driving source 32. The temperature of the first driving source 32 is also referred to as a first driving source temperature. The second temperature sensor 702 may detect, as the first driving source temperature, a temperature of the refrigerant RF3 heated by taking away heat from the first driving source 32. That is, the second temperature sensor 702 may detect, as the first driving source temperature, a temperature of the refrigerant RF3 flowing from the first driving source 32 toward the heat exchanger 62. The first abnormality detection sensor 703 detects an abnormality in the power generation unit cooling mechanism 44. The first abnormality detection sensor 703 includes, for example, a sensor for detecting whether or not the opening operation of the first shutter device 48 is hindered, but is not limited thereto. The first abnormality detection sensor 703 may include, for example, a sensor for detecting various abnormalities of the first pump 52. The second abnormality detection sensor 704 detects abnormality of the driving source cooling mechanism 46. The second abnormality detection sensor 704 includes, for example, a sensor 70 for detecting whether or not the opening operation of the second shutter device 56 is hindered, but is not limited thereto. The second abnormality detection sensor 704 may include, for example, a sensor 70 for detecting various abnormalities of the second pump 60. Various detection signals output from the plurality of sensors 70 are input to the vehicle control device 28.

As shown in FIG. 1, the air-cooling device 26 may be provided in the second drive device 18 of the vehicle 10. The air-cooling device 26 is a device that cools the refrigerant RF4 (FIG. 1). The refrigerant RF4 is a refrigerant for cooling the second driving source 40. The refrigerant RF4 is preferably, but not limited to, a liquid refrigerant. The air-cooling device 26 cools the refrigerant RF4 by using, for example, outside air. Although not shown in detail, the air-cooling device 26 includes, for example, a housing that houses the second driving source 40 and the refrigerant RF4. Such a housing is provided with a heat dissipation portion. The heat dissipation portion has, for example, a fin shape. The heat dissipation portion actively performs heat exchange when the traveling wind is passing therethrough. The refrigerant RF4 exchanges heat with the outside air through the heat dissipation portion. The refrigerant RF4 can thus be air-cooled. The second driving source 40 can be cooled by the air-cooled refrigerant RF4.

Figure 3:
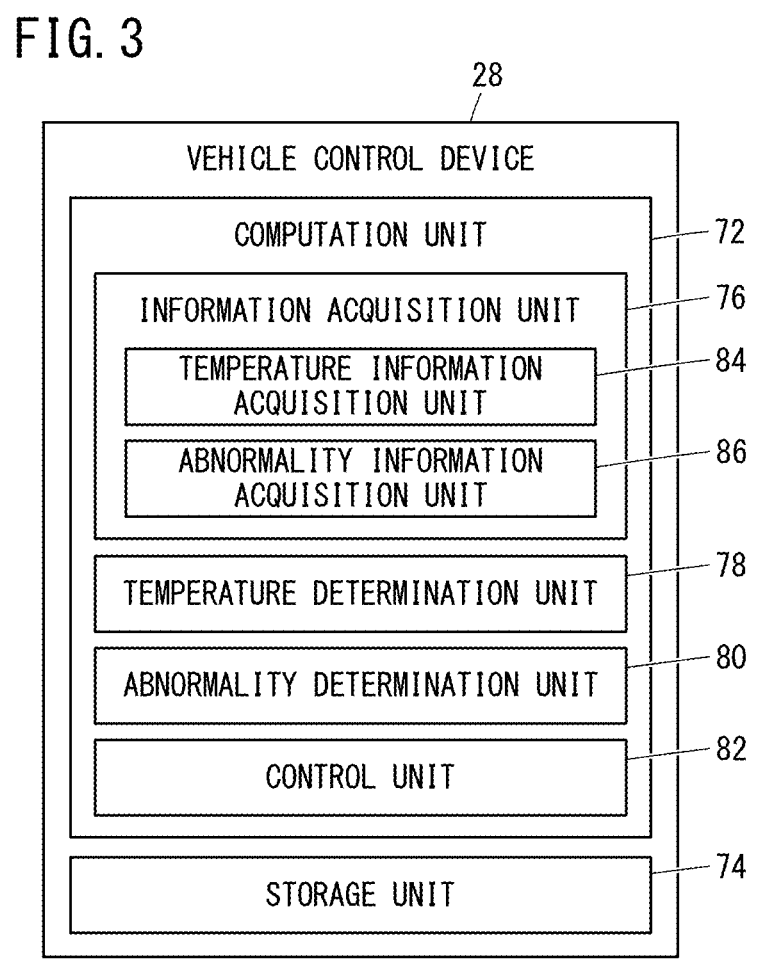

FIG. 3 is a block diagram of the vehicle control device 28 according to the embodiment.

The vehicle control device 28 is an electronic device (computer) that controls the vehicle 10. The vehicle control device 28 is included in, for example, an electronic control unit (ECU). The vehicle control device 28 includes a computation unit 72 and a storage unit 74.

The computation unit 72 includes a predetermined processing circuitry (not shown). The processing circuitry, for example, includes at least one processor such as a CPU (Central Processing Unit), a GPU (Graphics Processing Unit), or the like. The processing circuitry may include a predetermined integrated circuit such as an application specific integrated circuit (ASIC) or a field-programmable gate array (FPGA).

The storage unit 74 includes one or more memories. The one or more memories include a nonvolatile memory. The nonvolatile memory is a storage medium that non-transitorily stores a program, a table, a map, and the like. Examples of the nonvolatile memory include a ROM (Read Only Memory), a flash memory, or the like. The storage unit 74 (one or more memories) may include a volatile memory. Examples of the volatile memory include a RAM (Random Access Memory) or the like.

The computation unit 72 includes an information acquisition unit 76, a temperature determination unit 78, an abnormality determination unit 80, and a control unit 82. The information acquisition unit 76, the temperature determination unit 78, the abnormality determination unit 80, and the control unit 82 are realized by the computation unit 72

(processor) executing programs which are stored in the storage unit 74 (memory). At least a portion of the information acquisition unit 76, the temperature determination unit 78, the abnormality determination unit 80, and the control unit 82 may be realized by the integrated circuit such as the ASIC or the FPGA described above.

The information acquisition unit 76 includes a temperature information acquisition unit 84 and an abnormality information acquisition unit 86. The temperature information acquisition unit 84 acquires a detection signal from the first temperature sensor 701. The temperature information acquisition unit 84 acquires a detection signal from the second temperature sensor 702. The abnormality information acquisition unit 86 acquires a detection signal from the first abnormality detection sensor 703. The abnormality information acquisition unit 86 acquires a detection signal from the second abnormality detection sensor 704.

The temperature determination unit 78 determines whether or not the power generation unit temperature is equal to or higher than a power generation unit temperature threshold. The power generation unit temperature can be grasped based on the detection signal from the first temperature sensor 701 acquired by the temperature information acquisition unit 84. The power generation unit temperature threshold is determined, for example, based on experiments. The information indicating the power generation unit temperature threshold is stored in advance in the storage unit 74.

The temperature determination unit 78 determines whether the first driving source temperature is equal to or higher than the first driving source temperature threshold. The first driving source temperature can be grasped based on the detection signal from the second temperature sensor 702 acquired by the temperature information acquisition unit 84. The first driving source temperature threshold is determined, for example, based on experiments. The information indicating the first driving source temperature threshold is stored in advance in the storage unit 74.

The abnormality determination unit 80 determines whether the power generation unit cooling mechanism 44 has an abnormality or in a normal condition. Whether the power generation unit cooling mechanism 44 has an abnormality can be grasped based on the detection signal from the first abnormality detection sensor 703 acquired by the abnormality information acquisition unit 86. The abnormality determination unit 80 determines, for example, whether or not the opening operation of the first shutter device 48 is hindered based on the detection signal from the first abnormality detection sensor 703. In the case where the opening operation of the first shutter device 48 is hindered, the abnormality determination unit 80 can determine that the power generation unit cooling mechanism 44 has an abnormality.

The abnormality determination unit 80 determines whether the driving source cooling mechanism 46 is normal or has an abnormality. Whether the driving source cooling mechanism 46 is normal can be grasped based on the detection signal from the second abnormality detection sensor 704 acquired by the abnormality information acquisition unit 86. The abnormality determination unit 80 determines, for example, whether or not the opening operation of the second shutter device 56 is hindered based on the detection signal from the second abnormality detection sensor 704. In the case where the opening operation of the second shutter device 56 is hindered, the abnormality determination unit 80 can determine that the driving source cooling mechanism 46 has an abnormality.

The control unit 82 executes a process for determining a driving force distribution ratio and a process for travel control.

The process for determining the driving force distribution ratio is a process for determining the driving force distribution ratio between the first drive wheel 12 and the second drive wheel 14 that are driven so as to satisfy the required driving force. The driving force distribution ratio represents a driving force required for the vehicle 10. The required driving force is derived based on, for example, a vehicle speed that is a travel speed of the vehicle 10 and an accelerator pedal (AP) opening of the vehicle 10. The information indicating the vehicle speed can be acquired by the information acquisition unit 76 described above, for example, based on a detection signal from a vehicle speed sensor (not shown) provided in the vehicle 10. The information indicating the AP opening can be acquired by the information acquisition unit 76 described above, for example, based on a detection signal from an accelerator pedal sensor (not shown) provided in the vehicle 10.

The driving force distribution ratio between the first drive wheel 12 and the second drive wheel 14 can be determined to be, for example, "first drive wheel 12:second drive wheel 14=50:50" by the process for determining the driving force distribution ratio, but is not limited thereto. The control unit 82 determines the driving force distribution ratio in a flexible manner based on, for example, the required driving force (AP opening) and the vehicle speed. The control unit 82 may determine the driving force distribution ratio using a control map in which a relationship among the required driving force, the vehicle speed, and the driving force distribution ratio is defined. The control map is stored in advance in the storage unit 74, for example.

The process for travel control is a process for causing the vehicle 10 to travel. The control unit 82 controls the electrical power generation unit 30 based on the required driving force and the driving force distribution ratio. The electrical power generation unit 30 can supply electrical power to the first drive device 16 and a second drive device 18 based on the required driving force and the driving force distribution ratio. Thus, the vehicle 10 can travel.

The control unit 82 executes a first driving source protection process and a power generation unit protection process. The control unit 82 can suppress an increase in the temperature of the first driving source 32 by executing the first driving source protection process to protect the first driving source 32 from heat. On the other hand, the power generation unit protection process is a process for protecting the electrical power generation unit 30 from heat.

In the case where the temperature determination unit 78 determines that the first driving source temperature (the temperature of the first driving source 32) is equal to or higher than the first driving source temperature threshold, the control unit 82 executes the first driving source protection process. The first driving source protection process includes, for example, a process of reducing the driving force distribution ratio to the first drive wheel 12. Thus, the temperature rise of the first driving source 32 can be suppressed. The control unit 82 may increase the driving force distribution ratio to the second drive wheel 14 in an amount corresponding to the decrease in the driving force distribution ratio to the first drive wheel 12.

In the case where the abnormality determination unit 80 determines that the power generation unit cooling mechanism 44 has an abnormality, the control unit 82 executes the power generation unit protection process. The power generation unit protection process includes a supply limiting process. The supply limiting process is a process for limiting the supply of electrical power from the electrical power generation unit 30 to the second driving source 40. The control unit 82 may decrease the driving force distribution ratio to the second drive wheel 14. The decrease in the driving force distribution ratio to the second drive wheel 14 can result in a limitation on the supply of electrical power from the electrical power generation unit 30 to the second driving source 40. The control unit 82 may restrict the upper limit value of the second driving force. Restriction to the upper limit value may result in limitation of the supply of electrical power from the electrical power generation unit 30 to the second driving source 40.

The control unit 82 can decrease the electrical power supplied from the electrical power generation unit 30 to the second driving source 40 to zero by executing the supply limiting process. In this case, the second drive wheel 14 functions as a driven wheel that is driven by the first drive wheel 12. Such a second driving source 40 may be used to generate regenerative electrical power using a rotational force of the second drive wheel 14.

The control unit 82 may not execute the supply limiting process in the case where at least (either) one of the following (i) and (ii) is satisfied: (i) The power generation unit temperature is less than the power generation unit temperature threshold; and (ii) The driving source cooling mechanism 46 has an abnormality.

The control unit 82 can determine whether or not the above (i) is satisfied based on the determination result by the temperature determination unit 78. The control unit 82 can determine whether or not the above (ii) is satisfied based on the determination result by the abnormality determination unit 80.

FIG. 4 is a flowchart of a vehicle control method according to the embodiment.

The vehicle control method of FIG. 4 can be executed by the vehicle control device 28 (computer) described above. The vehicle control method of FIG. 4 is executed, for example, by the computation unit 72 (processor) executing programs which are stored in the storage unit 74 (memory). The method includes an abnormality information acquisition step S1, a first abnormality determination step (abnormality determination step) S2, a second abnormality determination step S3, a power generation unit temperature acquisition step S4, a power generation unit temperature determination step S5, and a power generation unit protection step (control step) S6. The method further includes a first driving source temperature acquisition step S7, a first driving source temperature determining step S8, and a first driving source protection step S9.

In the abnormality information acquisition step S1, the abnormality information acquisition unit 86 (information acquisition unit 76) acquires detection signals from the first abnormality detection sensor 703 and the second abnormality detection sensor 704. The abnormality information acquisition step S1 may be included in, for example, an activation process (initialization) of the vehicle 10. In this case, the abnormality information acquisition step S1 can be executed during the activation of the vehicle 10 (ignition switch is turned on).

In the first abnormality determination step S2, the abnormality determination unit 80 determines whether or not the power generation unit cooling mechanism 44 has an abnormality based on the detection signal from the first abnormality detection sensor 703.

In the case where the power generation unit cooling mechanism 44 is normal, the vehicle control device 28 ends the vehicle control method of FIG. 4. Although not shown, in the case where the power generation unit cooling mechanism 44 is normal, the vehicle control device 28 (the control unit 82) can execute a process for determining a driving force distribution ratio and the travel control process described above.

In the case where the power generation unit cooling mechanism 44 has an abnormality, the second abnormality determination step S3 is executed. In the second abnormality determination step S3, the abnormality determination unit 80 determines whether the driving source cooling mechanism 46 is normal based on the detection signal from the second abnormality detection sensor 704.

In the case where the driving source cooling mechanism 46 is normal, the power generation unit temperature acquisition step S4 is executed. In contrast, in the case where the driving source cooling mechanism 46 has an abnormality, the first driving source temperature acquisition step S7 is executed. The power generation unit temperature acquisition step S4 and the first driving source temperature acquisition step S7 may be performed while the hybrid vehicle 10 is traveling.

In the power generation unit temperature acquisition step S4, the temperature information acquisition unit 84 (the information acquisition unit 76) acquires the detection signal from the first temperature sensor 701. Next, the process transitions to a power generation unit temperature determination step S5, and the temperature determination unit 78 determines whether or not the power generation unit temperature is equal to or higher than the power generation unit temperature threshold based on the detection signal.

In the case where the power generation unit temperature is lower than the power generation unit temperature threshold, the temperature information acquisition unit 84 executes the power generation unit temperature acquisition step S4 again. In the case where the power generation unit temperature is equal to or higher than the power generation unit temperature threshold, the vehicle control device 28 executes the power generation unit protection step S6.

In the power generation unit protection step S6, the control unit 82 executes a power generation unit protection process. As described above, the power generation unit protection process includes the supply limiting process.

In the first driving source temperature acquisition step S7, the temperature information acquisition unit 84 (the information acquisition unit 76) acquires the detection signal of the second temperature sensor 702. Next, the process transitions to the first driving source temperature determination step S8, and the temperature determination unit 78 determines whether the first driving source temperature is equal to or higher than the first driving source temperature threshold based on the detection signal.

If the first driving source temperature is lower than the first driving source temperature threshold, the temperature information acquisition unit 84 executes the first driving source temperature acquisition step S7 again. In the case where the first driving source temperature is equal to or higher than the first driving source temperature, the first driving source protection step S9 is executed. In the first driving source protection step S9, the control unit 82 executes the first driving source protection process described above.

Although not shown, even in the case where the driving source cooling mechanism 46 is normal, the first driving source temperature acquisition step S7 and the first driving source temperature determination step S8 may be executed. In this case, if the first driving source temperature is equal to or higher than the first driving source temperature threshold, the control unit 82 may execute the first driving source protection step S9 in preference to the power generation unit protection step S6.

The vehicle control device 28 (vehicle control method) and the vehicle 10 including the vehicle control device 28 described above can achieve, for example, the following operational effects.

The vehicle control device 28 includes the control unit 82. The control unit 82 may execute the supply limiting process in the case where the power generation unit cooling mechanism 44 (cooling mechanism) has an abnormality. In this manner, the supply of electrical power from the electrical power generation unit 30 to the second driving source 40 is limited. The control unit 82 increases the amount of electrical power supplied from the electrical power generation unit 30 to the first driving source 32 in order to satisfy the required driving force while limiting the supply of electrical power to the second driving source 40. The amount of electrical power to be supplied to the second driving source 40 decreases and the amount of electrical power supplied to the first driving source 32 increases, so that the electrical power efficiency of the vehicle 10 improves. The vehicle 10 can travel a longer distance due to the improvement in the electrical power efficiency.

The supply limiting process is executed by the control unit 82, and thus, for example, the amount of electrical power supplied from the electrical power generation unit 30 to the second driving source 40 becomes zero. In this case, the second drive wheel 14 may function as a driven wheel that is driven by the first drive wheel 12. The second driving source 40 may use the rotational force of the second drive wheel 14 driven by the first drive wheel 12 to generate regenerative electrical power.

According to the present embodiment (FIG. 4), the control unit 82 executes the supply limiting process in the case where the power generation unit cooling mechanism 44 has an abnormality and the power generation unit temperature is equal to or higher than the power generation unit temperature threshold. In other words, even if the power generation unit cooling mechanism 44 has an abnormality, the control unit 82 does not execute the supply limiting process in the case where the power generation unit temperature is lower than the power generation unit temperature threshold. In this manner, the control unit 82 can suppress overheating of the electrical power generation unit 30 while maintaining a state in which the second drive wheel 14 is driven by the second driving source 40. By continuing to cause both the first drive wheel 12 and the second drive wheel 14 to function as drive wheels, the traveling stability of the vehicle 10 is maintained in a favorable manner.

According to the present embodiment, the control unit 82 executes the supply limiting process in the case where the power generation unit cooling mechanism 44 has an abnormality and the driving source cooling mechanism 46 is normal. In other words, even if the power generation unit cooling mechanism 44 has an abnormality, the control unit 82 does not execute the supply limiting process in the case where the driving source cooling mechanism 46 has an abnormality. Thus, the first driving source 32 is prevented from overheating due to the execution of the supply limiting process.

Further, if the first driving source temperature is equal to or higher than the first driving source temperature threshold, the control unit 82 may execute the first driving source protection process in preference to the power generation unit protection step S6. In this manner, overheating of the first driving source 32 may be reliably suppressed. In this case, the control unit 82 may execute the supply limiting process in the case where the power generation unit cooling mechanism 44 has an abnormality and the first driving source temperature is lower than a predetermined first driving source temperature threshold.

According to the present embodiment, in the case where the power generation unit cooling mechanism 44 has an abnormality, the driving force (first driving force) output from the first driving source 32 increases. The temperature of the first driving source 32 is likely to rise due to the increase in the first driving force. In this regard, according to the present embodiment, the cooling efficiency of the first driving source 32 is higher than the cooling efficiency of the second driving source 40. For example, the refrigerant RF3 for cooling the first driving source 32 is liquid-cooled. On the other hand, the refrigerant RF4 for cooling the second driving source 40 is air-cooled. In general, the cooling efficiency by liquid cooling is higher than the cooling efficiency by air cooling. Therefore, according to the present embodiment, even if the first driving force is increased in the case where the power generation unit cooling mechanism 44 has an abnormality, overheating of the first driving source 32 can be suppressed.

Even in the case where the supply limiting process is executed, the supply of electrical power from the electrical power generation unit 30 to the second driving source 40 may be continued. The control unit 82 reduces the amount of electrical power supplied from the electrical power generation unit 30 to the second driving source 40 by the supply limiting process, but the supply of electrical power from the electrical power generation unit 30 to the second driving source 40 may be continued. Even in this case, the driving force distribution ratio to the first drive wheel 12 increases, and the driving force distribution ratio to the second drive wheel 14 decreases. Consequently, the electrical power efficiency of the vehicle 10 is improved.

The following supplementary notes are further disclosed in relation to the above embodiment.

Supplementary Note 1

The vehicle control device (28) according to the present disclosure is provided for controlling the vehicle (10) including the electrical power generation unit (30) configured to supply electrical power to the first driving source (32) for driving a first drive wheel (12) and to the second driving source (40) for driving the second drive wheel (14), and the first cooling mechanism configured to cool the electrical power generation unit, the vehicle control device including: the abnormality determination unit (80) configured to determine whether the cooling mechanism has an abnormality; and a control unit (82) configured to execute an supply limiting process for limiting a supply of electrical power from the electrical power generation unit to the second driving source in the case where the first cooling mechanism has an abnormality. In this manner, the vehicle can maintain the traveling state for as long a time as possible even in the case where cooling efficiency of the internal combustion engine is limited.

Supplementary Note 2

The vehicle control device according to Supplementary Note 1 may further include the information acquisition unit (76) configured to acquire information indicating the power generation unit temperature which is a temperature of the electrical power generation unit, wherein the control unit may execute the supply limiting process in the case where the first cooling mechanism has an abnormality and the power generation unit temperature is equal to or higher than the predetermined temperature threshold for the electrical power generation unit. Thus, the traveling stability of the vehicle is maintained in a favorable manner.

Supplementary Note 3

In the vehicle control device according to Supplementary Note 1, the abnormality determination unit may be configured to further determine whether the second cooling mechanism (46) provided in the vehicle and configured to cool the first driving source is normal, and the control unit may execute the supply limiting process in the case where the first cooling mechanism has an abnormality and the second cooling mechanism is normal. Thus, the first driving source is prevented from overheating due to the execution of the supply limiting process.

Supplementary Note 4

The vehicle control device according to Supplementary Note 1 may further include the information acquisition unit (76) configured to acquire information indicating the first driving source temperature which is a temperature of the first driving source, wherein the control unit may execute the supply limiting process in the case where the first cooling mechanism has an abnormality and the first driving source temperature is lower than a predetermined temperature threshold for the first driving source. In this manner, overheating of the first driving source may be reliably suppressed.

Supplementary Note 5

In the vehicle control device according to Supplementary Note 4, the control unit may be configured to decrease the driving force distribution ratio to the first driving source in the case where the first driving source temperature is equal to or higher than the temperature threshold for the first driving source. In this manner, overheating of the first driving source may be reliably suppressed.

Supplementary Note 6

In the vehicle control device according to any one of Supplementary Notes 1 to 5, a cooling efficiency of the second driving source may be lower than a cooling efficiency of the first driving source. In this manner, even if the first driving force is increased in the case where the first cooling mechanism has an abnormality, overheating of the first driving source can be suppressed.

Supplementary Note 7

In the vehicle control device according to any one of Supplementary Notes 1 to 6, the first cooling mechanism may include the shutter device (48) for taking in outside air, and the abnormality determination unit determines that the first cooling mechanism has an abnormality in the case where opening of the shutter device is hindered. In this manner, in the case where it is difficult to take cool air into the vehicle, the vehicle control device can protect the power generation unit.

Supplementary Note 8

The vehicle (10) according to the present disclosure includes the vehicle control device according to any one of Supplementary Notes 1 to 7. In this manner, the vehicle can maintain the traveling state for as long a time as possible even in a case where cooling efficiency of the internal combustion engine is limited.

Supplementary Note 9

The vehicle control method according to the present disclosure is executed by a computer for controlling the vehicle (10) including an electrical power generation unit (30) configured to supply electrical power to the first driving source (32) for driving the first drive wheel (12) and the second driving source (40) for driving a second drive wheel (14), and the cooling mechanism configured to cool the electrical power generation unit, the vehicle control method including: the abnormality determination step (S2) of determining whether the cooling mechanism has an abnormality; and the control step (S6) of executing an supply limiting process for limiting a supply of electrical power from the electrical power generation unit to the second drive source in the case where the cooling mechanism has an abnormality. In this manner, the vehicle can maintain the traveling state for as long a time as possible even in a case where cooling efficiency of the internal combustion engine is limited.

Supplementary Note 10

The program according to the present disclosure is configured to cause the computer to execute the vehicle control method according to Supplementary Note 9.

It should be noted that the present invention is not limited to the disclosure described above, and various additional or alternative configurations could be adopted therein without departing from the essence and gist of the present disclosure.

The invention claimed is:

1. A vehicle control device for controlling a vehicle including: an electrical power generation unit configured to supply electrical power to a first driving source for driving a first drive wheel and to a second driving source for driving a second drive wheel; and a first cooling mechanism configured to cool the electrical power generation unit, the vehicle control device comprising one or more processors that execute computer-executable instructions stored in a memory, wherein the one or more processors execute the computer-executable instructions to cause the vehicle control device to:

determine whether the first cooling mechanism has an abnormality; and execute a supply limiting process for limiting a supply of electrical power from the electrical power generation unit to the second drive source in a case where the first cooling mechanism has an abnormality.

2. The vehicle control device according to claim 1, wherein the one or more processors cause the vehicle control device to:

acquire information indicating a power generation unit temperature which is a temperature of the electrical power generation unit; and execute the supply limiting process in a case where the first cooling mechanism has an abnormality and the power generation unit temperature is equal to or higher than a predetermined temperature threshold for the electrical power generation unit.

3. The vehicle control device according to claim 1, wherein the one or more processors cause the vehicle control device to:

further determine whether a second cooling mechanism that is provided in the vehicle and configured to cool the first driving source is normal; and execute the supply limiting process in a case where the first cooling mechanism has an abnormality and the second cooling mechanism is normal.

4. The vehicle control device according to claim 1, wherein the one or more processors cause the vehicle control device to:

acquire information indicating a first driving source temperature which is a temperature of the first driving source; and execute the supply limiting process in a case where the first cooling mechanism has an abnormality and the first driving source temperature is lower than a predetermined temperature threshold for the first driving source.

5. The vehicle control device according to claim 4, wherein the one or more processors cause the vehicle control device to:

cause a driving force distribution ratio to the first driving source to decrease in a case where the first driving source temperature is equal to or higher than the temperature threshold for the first driving source.

6. The vehicle control device according to claim 1, wherein a cooling efficiency of the second driving source is lower than a cooling efficiency of the first driving source.

7. The vehicle control device according to claim 1, wherein the first cooling mechanism includes a shutter device for taking in outside air, and the one or more processors cause the vehicle control device to determine that the first cooling mechanism has an abnormality in a case where opening of the shutter device is hindered.

8. A vehicle comprising the vehicle control device according to claim 1.

9. A vehicle control method executed by a computer, the vehicle control method controlling a vehicle including an electrical power generation unit configured to supply electrical power to a first driving source configured to drive a first drive wheel and to a second driving source configured to drive a second drive wheel, and a cooling mechanism configured to cool the electrical power generation unit, the vehicle control method comprising:

determining whether or not the cooling mechanism has an abnormality;

executing a supply limiting process for limiting a supply of electrical power from the electrical power generation unit to the second drive source in a case where the cooling mechanism has an abnormality.

10. A non-transitory tangible computer-readable storage medium storing a program configured to cause a computer to execute the vehicle control method according to claim 9.

* * * * *